United States Patent [19]

Anderson et al.

[11] Patent Number: 4,864,847

[45] Date of Patent: Sep. 12, 1989

[54] FLUID LEAK INDICATOR

[75] Inventors: George E. Anderson, Lakewood; Shu Loo, Cerritos, both of Calif.

[73] Assignee: The United States of America as represented by the Administrator of the National Aeronautics and Space Administration, Washington, D.C.

[21] Appl. No.: 738,931

[22] Filed: May 29, 1985

[51] Int. Cl.$^4$ .......................................... G01M 3/00
[52] U.S. Cl. ....................................... 73/40.7; 73/46
[58] Field of Search ............. 285/93; 73/46, 40, 40.7, 73/49.1, 40.5 R; 174/11 R; 137/312; 138/104; 116/219

[56] References Cited

U.S. PATENT DOCUMENTS

| | | | |
|---|---|---|---|
| 1,571,657 | 2/1926 | Wilkinson | 73/47 |
| 2,460,215 | 1/1949 | Chase | 99/192 |
| 2,601,840 | 7/1952 | Smith et al. | 116/114 |
| 2,708,896 | 5/1955 | Smith et al. | 116/114 |
| 2,918,033 | 12/1959 | Snyder | 116/114 |
| 2,918,893 | 12/1959 | Norton | 116/114 |
| 2,930,511 | 3/1960 | Vanderstrom | 73/40.7 |
| 3,043,129 | 7/1962 | King | 73/40 |
| 3,485,085 | 12/1969 | Hawkins | 73/46 |
| 3,531,264 | 9/1970 | Greipel | 137/312 X |
| 3,620,677 | 11/1971 | Morison | 116/207 |
| 3,954,011 | 5/1976 | Manske | 116/219 X |
| 4,079,620 | 3/1978 | Jester | 374/5 |
| 4,295,669 | 10/1981 | La Prade | 285/93 |

Primary Examiner—Hezron E. Williams
Attorney, Agent, or Firm—Hardie R. Barr; John R. Manning; Edward K. Fein

[57] ABSTRACT

A fluid leak indicator (30) for detecting and indicating leaks in visually inaccessible fluid tubing joints (20, 21), such as those obstructed by insulation (24), includes a bag system (25) and a wicking system (30) surrounding or wrapping the joints (20, 21) under the visual obstructing material (24). Leaking fluid is collected in the bag (25) or on the wicking material (34) where it is conducted along the wicking material (34) to a visibly accessible capturing transparent indicator bulb (35) for providing a visual indication of the leak without requiring a chemical change in the capturing indicator bulb (35).

8 Claims, 1 Drawing Sheet

U.S. Patent  Sep. 12, 1989  4,864,847
FIG. 1
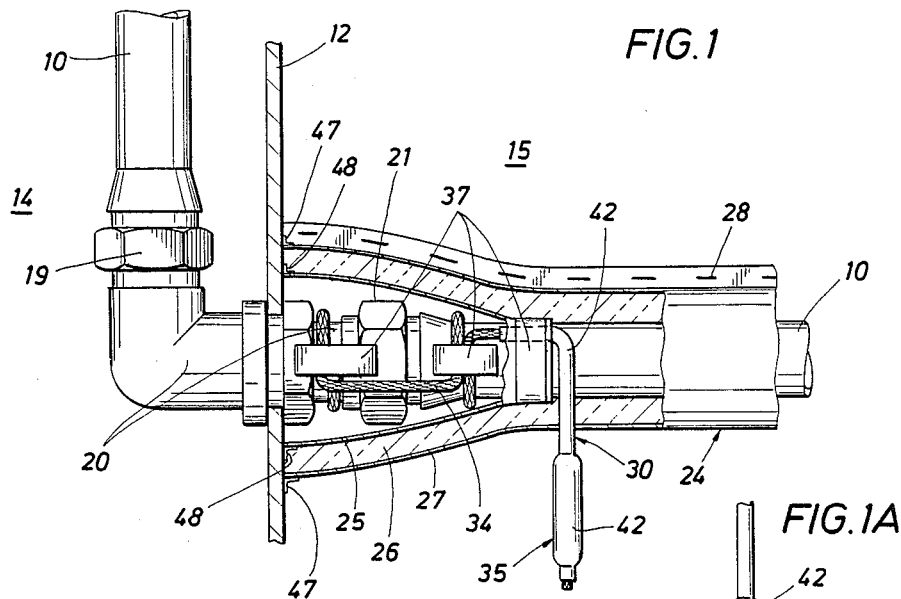
FIG. 1A
FIG. 2
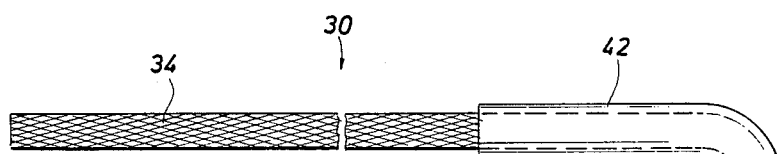
FIG. 3
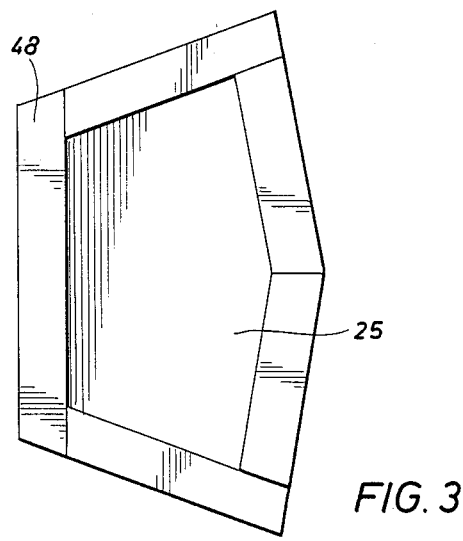
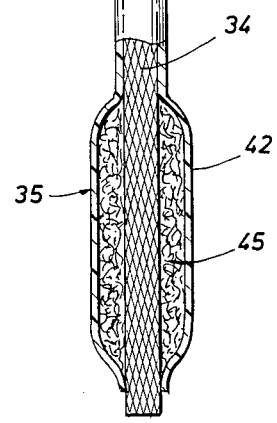

FLUID LEAK INDICATOR

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

The present invention relates to leak detection, and more particularly to a passive fluid leak detector and indicator which is particularly suited for detecting leaks in hidden, visually obstructed locations.

Many hydraulic systems have several joints and/or fittings which are not readily visible, and are thus difficult to inspect during normal maintenance. Sometimes minor leakage at such joints is not a problem, so routine inspections are not necessary. With other equipment, such as aerospace systems like the Space Shuttle, leakage can be even more critical than on conventional aircraft or ground hydraulic systems. Maintenance and turn-around inspection times in such specialized craft are therefore impacted by the necessity to verify the hydraulic system integrity. In such cases, hidden joints and fittings can considerably increase this inspection time.

Many so-called "hidden" joints, while not directly accessible visually, can still be easily inspected, for example with inspection mirrors. However, when portions of the hydraulic system are insulated, as in spacecraft such as the Shuttle, such indirect observation is precluded and leak detection becomes a difficult, time consuming, and critical problem. (The Shuttle has over 2,000 joints which must be inspected at the conclusion of each flight.)

The prior art, of course, includes various known means for remote detection of leaks. Much of this technology, however, is elaborate and heavy, and not readily adaptable to use with aerospace systems. There are a number of relatively simple leakage detectors known, but these primarily reveal or provide a telltale at the location of the leak, and are not adequate to provide a remote indication in the environment just described. For example, U.S. Pat. Nos. 2,601,840 (M. F. Smith et al., issued July 1, 1952) and 2,708,896 (M. F. Smith et al., issued May 24, 1955) disclose protective covers for pipe flanges and valves. The covers, which are intended to contain possibly harmful leakage materials, have indicating chemicals to reveal such a leak. In several embodiments a wick may be used to conduct the fluid to an indicator outside the cover by means of capillary action. Remote indication as discussed above, however, is not addressed.

U.S. Pat. No. 3,485,085 (W. M. Hawkins, Jr., issued Dec. 23, 1969) discloses a leak detector around a joint, wherein moisture which leaks condenses and then travels by capillary action to a leak detecting tape. The color and resistivity of the tape then change to reveal the detected leak. The leak detecting tape is displaced a short distance from the joint not due to visual inaccessibility, but to provide room for intervening insulation to keep the leak detecting tape cooler than the joint.

U.S. Pat. Nos. 2,918,033 (Snyder, issued Dec. 22, 1959) and 2,918,893 (Norton, issued Dec. 29, 1959) provide in situ detection of leakage at joints which are apparently already visibly accessible.

U.S. Pat. No. 2,460,215 (K. J. Chase, issued Jan. 25, 1949) discloses a telltale for frozen food packages. A water capsule breaks upon freezing, and subsequent melting causes a wick to convey the water to a visual color changing indicator at the surface of the package being monitored. The device is thus not directed to remote leakage detection. Also, it depends upon a chemical which changes color when wetted by the moisture which is being detected.

As may be seen, therefore, a need still remains for an improved, inexpensive, uncomplicated, and light weight fluid leak indicator for detecting fluid leaks in hidden, visually inaccessible locations. Such an indicator should be easy to install, should preferably be able to provide an indication at a point distant from the leak, and should also be able to readily indicate the presence of leaks without requiring a chemical change in the indicator. Ideally, such an indicator should also be resistant to "false alarms" which might occur from exposure to fluid at locations other than that being monitored. Further, such an indicator should, in the preferred embodiment, be physically self-sustaining, as may be required, such that it can retain its own shape in whatever configuration may be desired.

SUMMARY OF THE INVENTION

Briefly, the present invention meets the above needs and purposes with an improved fluid leak indicator and method for detecting fluid leaks in hidden, visually inaccessible locations. In a preferred embodiment of the invention, the fluid leak indicator includes a length of braided "KEVLAR" wicking material having a portion at a visually inaccessible first location of potential fluid leakage. This location is preferably enclosed in a semi-sealed bag which helps direct any such fluid leakage to the wicking material. The braided wicking material then extends from the visually inaccessible first location to a visually accessible second location which is distant from the first location. In this manner the wicking material, by means of capillary action, conducts leakage fluid which may be present at the first location to the second location, where it can be collected as needed.

A capturing transparent indicator bulb is positioned in contact with the wicking material at the visually accessible second location. The bulb thereby collects leakage fluid conducted thereto by the wicking material, to visually indicate the presence therein of the leakage fluid. The capturing transparent indicator bulb provides this indication without requiring a chemical change, by including therein, in the preferred embodiment, fibrous insulation which readily reveals the presence of leakage fluid without requiring a chemical change.

To help the fluid leak indicator retain whatever configuration may be desired, and to make it resistant to exposure to fluids at locations other than that being monitored, the corresponding portion(s) of the indicator includes an impervious transparent coating of heat shrink tubing applied to the exterior thereof. Having been shaped under heat, it then retains that shape while cool. Also, the capturing indicator bulb includes such heat shrink tubing surrounding the fibrous insulation, this tubing being partially closed at each end thereof.

In operation, the detector is first fabricated and shaped as desired. Then the end thereof opposite the capturing indicator bulb is placed within the semi-sealed bag in contact with the visually inaccessible region of potential fluid leakage. The capturing indicator bulb is then located in the second, visually accessible location, so that the wicking material can then conduct leakage fluid from the former to the latter for collection in the capturing indicator bulb. The presence of such fluid in the capturing transparent indicator bulb provides a visual indication, without requiring chemical change in the indicator, which reveals a leak at the visibly inaccessible location.

It is therefore an object of the present invention to provide an improved fluid leak indicator and method for detecting fluid leaks in hidden, visually inaccessible locations; such an indicator and method in which a wicking material extends from a visually inaccessible first location of potential fluid leakage to a visually accessible second location distant from the first location, for conducting leakage fluid from the first location to the second location; which includes an indicator means on the wicking material at the visually accessible second location; in which the indicator means collects leakage fluid conducted thereto by the wicking material for visually indicating the presence of the leakage fluid at the indicator; in which the indicator provides such a visual indication without requiring a chemical change in the indicator; and to accomplish the above objects and purposes in an inexpensive, uncomplicated, durable, versatile, light weight, economical, and reliable method and apparatus which are easy to install and readily suited to the widest possible utilization in the detection and indication of fluid leaks in hidden, visually inaccessible, and often remote locations.

These and other objects and advantages of the invention will be apparent from the following description, the accompanying drawings, and the appended claims.

BRIEF DESCRIPTION OF THE DRAWINGS

FIG. 1 is a somewhat figurative illustration, partially in section, showing a fluid leak indicator according to the present invention installed on two visually inaccessible hydraulic fittings which are surrounded with insulation;

FIG. 1A illustrates the visible change in appearance of the indicator bulb shown in FIGS. 1 and 2;

FIG. 2 is a plan view, partially in section, of the fluid leak indicator shown in FIG. 1; and FIG. 3 is a plan view, flat pattern, of the polyamide film bag which encloses the visually obstructed hydraulic fittings shown in FIG. 1.

DESCRIPTION OF THE PREFERRED EMBODIMENT

With reference to the drawings, the new and improved fluid leak indicator for detecting fluid leaks in hidden, visually inaccessible locations, and the method therefor according to the present invention, will be described. FIG. 1 shows a hydraulic line 10 and bulkhead fitting 20 passing through a bulkhead 12. Bulkhead 12 might divide, for example, a relatively benign environment or region 14 from a hostile one 15.

Line 10 is shown with three fittings 19, 20, and 21. Fitting 19 is located in region 14, while fittings 20 and 21 appear in region 15. To help protect line 10 from the hostile environment conditions in region 15, the portions of line 10 in region 15 are accordingly surrounded with thermal insulation 24. For reasons further explained below, portions of fittings 20 and 21 in region 15 are also surrounded with a semi-sealed polyimide film bag 25, located between the fittings and the insulation 24. As illustrated, the insulation consists of an inner layer 26 of fibrous insulation and an outer layer 27 of metal foil (folded and secured with staples 28 at the top). Clearly, due to the insulation 24, fittings 20 and 21 are not visually accessible for inspection for leakage. To verify their integrity it has therefore ordinarily been necessary to remove the insulation, inspect the fittings, and then apply a new insulative covering - an expensive and time consuming process.

The present invention provides a visual detection system or fluid leak indicator 30 (FIG. 2) which provides for rapid inspection of joints or fittings such as fittings 20 and 21 without regard to visual obstructions such as the insulation 24. In the preferred embodiment, this consists of a wicking material 34 which surrounds the visually inaccessible joint areas 20 and 21 of the hydraulic system 10 and directs any leakage fluids, by capillary action, to a remotely located and visually accessible capturing indicator bulb 35. When the fluid which is to be detected is hydraulic fluid, such as the red hydraulic oil (MIL-H-83282) used on the Shuttle system, the wicking material 34 in the preferred embodiment is braided aramid fiber sleeving sold under the Trademark "KEVLAR 49" and having characteristics as described in Dupont Bulletin K-5 "KEVLAR Aramid", dated September, 1981.

As may be seen in FIG. 1, the wicking material 34 is wrapped around the fittings 20 and 21 and secured in contact therewith, for example, by adhesive tape 37. The semi-sealed bag 25 (e.g., polyimide film conforming to MIL-P-46112) forms a bagging means which encloses the fittings 20 and 21 and helps to collect any fluid which leaks, to keep such leakage fluid off the insulation 26, and to direct the fluid to the wicking material 34. The wicking material then absorbs the hydraulic fluid and conducts it by capillary action, as indicated above, to the capturing indicator bulb 35 at the opposite end of the wicking material 34. The bulb 35 is located remotely from fittings 20 and 21, outside the insulation 24, and therefore visually accessible for inspection for leakage from fitting 20 or 21.

FIG. 2 shows the fluid leak indicator 30 in greater detail. As may be seen therein, a portion of the wicking material 34 has an outer impervious transparent heat shrink tubing 42 (e.g., MIL-I-7444) applied thereto. Tubing 42 prevents the wicking material 34 from transferring leakage fluid to adjacent insulation 26 when passing from bag 25 to the outside as shown in FIG. 1, and from absorbing liquids at locations other than the leakage areas being monitored (i.e., fittings 20 and 21). In the preferred embodiment, tubing 42 also strengthens the wicking material and keeps it in whatever predetermined configuration may be desired. To accomplish this, the tubing 42 in the preferred embodiment is simply transparent heat shrink tubing, to which the desired shape or configuration is imparted while under heat. It is then cooled in that shape so that it then retains that shape in use.

The capturing indicator bulb 35, as particularly shown in FIG. 2, is likewise composed on the outside of transparent heat shrink tubing 42, partially closed at each end thereof. Within the transparent heat shrink tubing bulb portion 35 is fibrous insulation material 45 in contact with the wicking material 34. Any suitable material that meets the requirements of the environment may be used which visually changes upon being wetted with the leakage material, preferably without requiring a chemical change for the visual indication. Such a visual change is depicted in FIG. 1A, where the white insulation 45 is visibly darker due to being wetted by the leakage liquid. When the liquid being detected is the hydraulic oil described above, a suitable fiber 45, for example, is fibrous insulation such as that which meets Rockwell International Corporation Spec. No. MBO135-024 (available from Hitco-Defense Products Div., Gardena, Calif., Part No. TG-15,000 Fiber). White insulation 45 is preferred for the indicator bulb since the "KEVLAR" braiding, while an excellent wicking material, shows little color change when wetted with this hydraulic oil.

FIG. 3 shows a flat pattern of the polyamide film bag 25 used to enclose the fittings 20 and 21 and the fluid collecting portions of fluid leak indicator 30, as shown in FIG. 1. The flat pattern configuration will change, of course, according to the type of fittings used. Half inch wide double-faced adhesive transfer tape 47, such as Scotch 465 (MIL-P-19834B, Type 1) is attached along the bag perimeter to provide the desired sealing of edges when the bag is used as an enclosure to contain the leakage fluid. Where the bag interfaces a bulkhead 12 as in FIG. 1, additional tape 48 is used to secure the bag to the bulkhead.

As may be seen, therefore, the present invention has numerous advantages. It particularly provides a convenient and quick visual indicator for rapid inspection of hidden, visually inaccessible locations for possible fluid leakage. It provides for detecting such fluid leaks by providing an indicator at a visually accessible location which is remote from the hidden leakage location being monitored. Advantageously, this indication is furnished without requiring a chemical change in the indicator. Due to the impervious heat shrink tubing 42, it is resistant to "false alarms" which might occur from exposure to fluid at locations other than that being monitored. Additionally, the invention is inexpensive, easily adapted to various shapes, light in weight, and easy to install. And, while discussed in connection with aerospace applications where detection of even minor hydraulic fluid leaks can be critically important, the invention clearly has valuable application in many other technologies such as petroleum, chemical, nuclear, and any others where fluid joints and fittings are inaccessible or are covered, and inspection for leakage cannot be directly accomplished without altering the structure, such as by removing the covering.

While the methods and forms of apparatus herein described constitute preferred embodiments of this invention, it is to be understood that the invention is not limited to these precise methods and forms of apparatus, and that changes may be made therein without departing from the scope of the invention.

What is claimed is:

1. A fluid leak indicator for detecting fluid leaks in hidden, visually inaccessible locations, comprising:
    (a) wicking means extending from a visually inaccessible first location of potential fluid leakage to a visually accessible second location distant from said first location, for conducting leakage fluid from said first location to said second location for collection at said second location,
    (b) fluid leakage capturing means surrounding said first location and a portion of the wicking means for collecting and directing leakage fluid to said wicking means,
    (c) impervious coating on the outside of at least a portion of said wicking means exterior to the fluid capturing means, and
    (d) indicator means on said wicking means at said visually accessible second location for collecting leakage fluid conducted thereto by said wicking means for visually indicating the presence of the leakage fluid at said indicator means without requiring a chemical change in said indicator means, wherein said impervious coating is transparent heat shrink tubing applied to the exterior of said portion of said wicking means.

2. The indicator of claim 1, wherein said heat shrink tubing is heat shrink tubing having a predetermined configuration to facilitate routing of wicking means from said first location to said second location, said predetermined configuration having been imparted by shaping said heat shrink tubing under heat and then cooling said tubing in said configuration to retain said configuration.

3. A fluid leak indicator for detecting fluid leaks in hidden, visually inaccessible locations, comprising:
    (a) wicking means extending from a visually inaccessible first location of potential fluid leakage to a visually accessible second location from said first location, for conducting leakage fluid from said first location to said second location for collection at said second location,
    (b) fluid leakage capturing means surrounding said first location and a portion of the wicking means for collecting and directing leakage fluid to said wicking means,
    (c) impervious coating on the outside of at least a portion of said wicking means exterior to the fluid capturing means, and
    (d) indicator means on said wicking means at said visually accessible second location for collecting leakage fluid conducted thereto by said wicking means for visually indicating the presence of the leakage fluid at said indicator means without requiring a chemical change in said indicator means, wherein said indicator means is a capturing transparent indicator bulb means, said capturing indicator bulb means further comprises fibrous insulation in contact with said wicking means at said second location, and wherein said capturing bulb indicator means further comprises transparent heat shrink tubing surrounding said fibrous insulation, said heat shrink tubing being partially closed at each end thereof.

4. A fluid leak indicator for detecting fluid leaks in hidden, visually inaccessible locations such as locations visually obstructed at least in part by insulation material, comprising:
    (a) a length of braided Aramid fiber wicking material having a portion at a visually inaccessible first location of potential fluid leakage, and said wicking material extending from said visually inaccessible first location to a visually accessible second location distant from said first location, for conducting leakage fluid from said first location to said second location for collection at said second location,
    (b) semi-sealed polyamide film bag means formed of a pattern of polyimide film having adhesive tape applied on at least the perimeter thereof, and surrounding said wicking means at said first location for collecting and directing leakage fluid to said wicking means, (c) an impervious coating of transparent heat shrink tubing applied to the exterior of at least a portion of said wicking material, said heat shrink tubing acting to keep fluid which is in said wicking material away from the obstructing insulation material, and said heat shrink tubing having a predetermined configuration imparted thereto by shaping said heat shrink tubing under heat and then cooling said tubing in said configuration to retain said configuration, and (d) capturing indicator bulb means in contact with said wicking material at said visually accessible second location for collecting leakage fluid conducted thereto by said wicking material for visually indicating the presence of the leakage fluid at said indicator bulb means without requiring a chemical change in said indicator means, said capturing indicator bulb means including fibrous insulation and transparent heat shrink tubing surrounding said fibrous insulation, said heat shrink tubing being partially closed at each end thereof.

5. A method for detecting fluid leaks in hidden, visually inaccessible locations, comprising:

(a) conducting leakage fluid by a wicking means from a visually inaccessible first location of potential fluid leakage to a visually accessible second location distant from the first location, for collection at the second location, the wicking means extending from the first location to the second location, (b) surrounding the first location and a portion of the wicking means with a leakage fluid capturing means for collecting and directing leakage fluid to the wicking means, (c) forming an impervious coating on the outside of at least a portion of the wicking means exterior to the fluid capturing means, and (d) collecting the leakage fluid in an indicator means on the wicking means at the visually accessible second location and visually indicating the presence of the leakage fluid at the indicator means without requiring a chemical change in the indicator means, wherein said step of forming an impervious coating on the outside of at least a portion of the wicking material further comprises applying transparent heat shrink tubing to the exterior portion of the wicking material.

6. The method of claim 5 further comprising shaping the transparent heat shrink tubing under heat and then cooling the tubing in a predetermined configuration to cause the tubing to retain that configuration to facilitate routing of wicking means from said first location to said second location.

7. A method for detecting fluid leaks in hidden, visually inaccessible locations, comprising:

(a) conducting leakage fluid by a wicking means from a visually inaccessible first location of potential fluid leakage to a visually accessible second location distant from the first location, for collecting at the second location, the wicking means extending from the first location to the second location.

(b) surrounding the first location and a portion of the wicking means with a leakage fluid capturing means for collecting and directing leakage fluid to the wicking means, (c) forming an impervious coating on the outside of at least a portion of the wicking means exterior to the fluid capturing means, and (d) collecting the leakage fluid in an indicator means on the wicking means at the visually accessible second location and visually indicating the presence of the leakage fluid at the indicator means without requiring a chemical change in the indicator means, wherein the indicator means is a capturing indicator bulb means, further comprising forming the capturing indicator bulb means of fibrous insulation in contact with the wicking material at the second location and still further comprising also forming the capturing indicator bulb means of transparent heat shrink tubing surrounding the fibrous insulation, and partially closing the heat shrink tubing at each end thereof.

8. A method for detecting fluid leaks in hidden, visually inaccessible locations such as locations visually obstructed at least in part by insulation material, comprising:

(a) conducting leakage fluid in a length of braided Aramid fiber wicking material from a visually inaccessible first location of potential fluid leakage to a visually accessible second location distant from the first location, for collecting at the second location, the wicking material having a portion at the visually inaccessible first location and extending from the first location to the visually accessible second location, (b) forming a semi-sealed polyimide film bag having a predetermined pattern and having adhesive tape applied on at least the perimeter of the pattern, and surrounding the wicking means with the film bag at the first location for collecting and directing leakage fluid to the wicking means, (c) forming an impervious transparent coating having a predetermined configuration on the outside of at least a portion of the wicking material by applying transparent heat shrink tubing to the exterior of that portion of the wicking material, shaping the heat shrink tubing under heat, and then cooling the tubing in the predetermined configuration to cause the tubing to retain that configuration, (d) forming a capturing indicator bulb means of fibrous insulation and transparent heat shrink tubing surrounding the fibrous insulation, positioning the fibrous insulation in contact with the wicking material at the second location, and partially closing the heat shrink tubing at each end thereof, and (e) collecting the leakage fluid in the capturing transparent indicator bulb means and visually indicating the presence of the leakage fluid at the indicator means without requiring a chemical change in the indicator means.

* * * * *